(12) United States Patent
Greenwood et al.

(10) Patent No.: US 9,811,395 B1
(45) Date of Patent: Nov. 7, 2017

(54) MULTI-PLATFORM MAPPING API

(71) Applicant: Google Inc., Mountain View, CA (US)

(72) Inventors: Benjamin Greenwood, Rozelle (AU); Damon Stacey, Pyrmont (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/290,884

(22) Filed: Oct. 11, 2016

(51) Int. Cl.
*G06F 9/54* (2006.01)
*H04L 29/06* (2006.01)
*H04L 29/08* (2006.01)

(52) U.S. Cl.
CPC ............. *G06F 9/541* (2013.01); *H04L 67/02* (2013.01); *H04L 67/20* (2013.01); *H04L 67/42* (2013.01)

(58) Field of Classification Search
CPC ......... G06F 9/541; H04L 67/42; H04L 67/02; H04L 67/20
See application file for complete search history.

(56) References Cited

U.S. PATENT DOCUMENTS

2008/0134049 A1* 6/2008 Gupta ............... G06F 9/4843
715/738
2012/0204089 A1* 8/2012 Boudreau ............ G01C 21/20
715/205

* cited by examiner

*Primary Examiner* — Syed Roni
(74) *Attorney, Agent, or Firm* — Dority & Manning, P.A.

(57) ABSTRACT

Systems and methods of linking two or more software applications using a multi-platform application programming interface (API) are provided. For instance, a uniform resource identifier (URI) associated with a multi-platform API associated with a mapping software application can be accessed. The multi-platform API can include a common URI syntax for use within a plurality of platforms. The URI can include a query string specifying one or more location parameters in accordance with the common URI syntax. The one or more location parameters can be configured to control an execution of the selected state by the mapping software application. A presence of the mapping application can be detected on the user device. The mapping application can be launched in the selected state based at least in part on the URI. The query string can be parsed to identify the location parameters. One or more actions can be performed based at least in part on the location parameters.

20 Claims, 12 Drawing Sheets

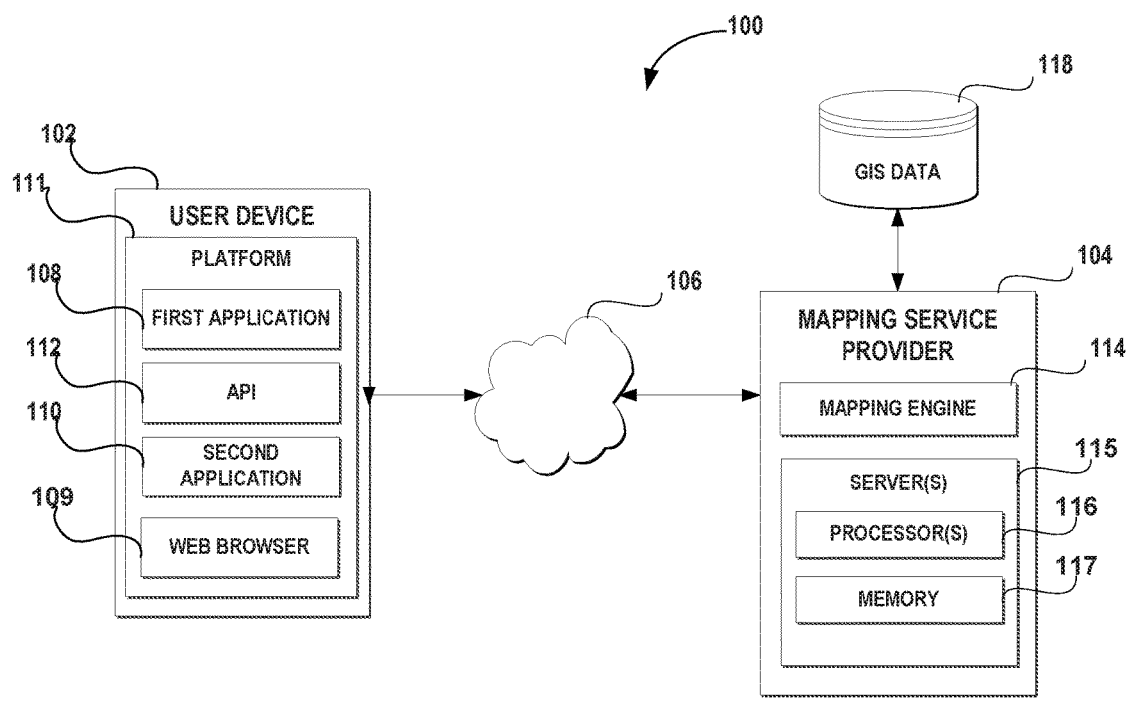

| Parameter | Description | Valid values |
|---|---|---|
| Map https://maps.google.com/maps/share/view | | |
| center (optional) | lat,lng center of viewport | lat,lng |
| zoom (optional) | initial zoom level of the map | values range from 0 (the whole world) to 21 (individual buildings) - limit varies by location. |
| maptype (optional) | defines the type of map to display | "roadmap" (default) "satellite" "terrain" "transit" "traffic" "bicycling" |
| Search https://maps.google.com/maps/share/search | | |

FIG. 1C

| Directions https://maps.google.com/maps/share/directions | | |
|---|---|---|
| origin (optional) | starting point for directions. optional, defaults to most relevant starting location (such as user location, if available) | - place search query<br>- address search query<br>- place ID<br>- lat,lng(label) |
| destination (required) | destination for directions | - place/address query<br>- place ID<br>- lat,lng(label) |
| travelmode (optional) | defines a preferred method of travel. optional, defaults to showing the most relevant mode for the specified route, which may be influenced by the users' location and preferences within the client. | 'driving'<br>'walking'<br>'bicycling'<br>'transit' |
| avoid (optional) | prefer directions that make use a particular travel mode or avoid certain routes<br><br>These flags can be combined together using the pipe character (e.g. \|avoid=tolls\|highways) | 'tolls'<br>'highways'<br>'ferries' |

FIG. 1E

| Streetview/3D https://maps.google.com/maps/share/streetview | | |
|---|---|---|
| viewpoint | display the panorama photographed closest to this viewpoint (optional if pano specified) | lat,lng |
| pano | a specific panorama ID obtained from a Google Maps API. | |
| heading (optional) | compass heading of the camera in degrees clockwise from North. | -180° to 360° |
| pitch (optional) | specifies the angle, up or down, of the camera | -90° to 90 (defaults to 0, position of the camera when the image was captured) |
| fov (optional) | Horizontal field of view of the image (expressed in degrees) | 10° - 100 (defaults to 90) |

FIG. 1F

| Parameter | Description | Valid values |
|---|---|---|
| Navigation<br>*Applies to the Directions endpoint.* | | |
| action=navigate<br>(optional) | Begin turn-by-turn navigation to the destination specified.<br>Recommended only to be used when destination is specified as a place_id or lat,lng.<br>Must specify 'travelmode' parameter.<br>Note that if it's not possible to fulfil the request (because there's no route between the origin and destination, for example) Navigation will not start, and this will behave as if action=navigate wasn't specified. | N/A |

FIG. 1G

| Multiple waypoints<br>Applies to the Directions endpoint | ordered waypoints to visit between origin & destination.<br><br>Multiple waypoints can be combined together using the pipe character ("|"). Maximum of 9 waypoints supported. | - place/address query<br>- place ID<br>- lat,lng |
|---|---|---|
| waypoints<br>(optional) | | |

FIG. 1H

MULTI-PLATFORM MAPPING API

FIELD

The present disclosure relates generally to facilitating communication between applications and more particularly to linking two or more software applications using a multi-platform application programming interface.

BACKGROUND

Applications implemented on computing devices, such as mobile computing devices (e.g., smartphones, tablets, smart watches, etc.) have been developed for a variety of purposes, including business, social, health, and other purposes. These applications can provide a user interface (e.g., a graphical user interface) for presenting information to a user as well as allowing the user to interact with the application. Popular applications for mobile computing devices include maps applications that make varied geographic information (e.g., current location information presented on a map) available to users.

Application programming interfaces can allow applications implemented on computing devices to interact with various services to provide information and functionality to a user. Application programming interfaces can provide a tool for developers to easily embed information, programming, services, frameworks, and structures into applications for access by the user. For example, a map service provider can provide a maps application programming interface that can be used by a third party to invoke the maps application from within an application developed by the third party.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of linking two or more applications associated with one or more applications. The method includes accessing, by one or more processors, a uniform resource identifier (URI) specifying a request to link to a selected state within a mapping software application from a third-party software application associated with a user device. The URI is associated with a multi-platform application programming interface (API) associated with the mapping software application. The multi-platform API includes a common URI syntax for use within a plurality of platforms. The URI includes a query string specifying one or more location parameters in accordance with the common URI syntax. The one or more location parameters are configured to control an execution of the selected state by the mapping software application on the user device.

Other example aspects of the present disclosure are directed to systems, apparatus, tangible, non-transitory computer-readable media, user interfaces, memory devices, and electronic devices for linking two or more applications.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 1A depicts an overview of an example system for linking one or more software applications according to example embodiments of the present disclosure;

FIG. 1B depicts a URI according to example aspects of the present disclosure;

FIGS. 1C, 1D, 1E, 1F, 1G, and 1H depict aspects of the present disclosure;

DETAILED DESCRIPTION

Figure 1D:

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to application programming interfaces ("APIs") for linking software applications implemented on a user computing device, such as web-based software applications implemented in a browser, locally-stored software applications, and other applications. In particular, an API according to example aspects of the present disclosure can define a common uniform resource identifier (URI) syntax capable of being implemented by a plurality of software platforms. For instance, the API can be invoked by a third party software application to provide a URI to a mapping software application on a user device. The URI can specify a request to link to a particular state of the mapping software application on the user device. In some implementations, the mapping software application can be associated with an entity that publishes the API, while the third party application can be associated with a separate and distinct entity from the entity that publishes the API.

In particular, the API can be a multi-platform API having a common URI syntax configured for use by a plurality of operating systems. For instance, the API can be configured for use by software applications running on the Android mobile operating system developed by Google Inc., the iOS mobile operating system developed by Apple Inc., and/or other suitable operating systems. In this manner, the API can be used by software applications running on various suitable operating systems to cause the mapping software application to launch in a desired state. The URI can specify the state of the mapping application in which a user desires the mapping application to launch. The states can be specified by the API. For instance, the API can specify a state for displaying a map, a state for searching for one or more locations and/or points of interest, a state for providing directions from an origin location to a destination location, a state for displaying a panoramic view (or other suitable view) of a streetscape, a state for providing navigation instructions from an origin location to a destination location, a state for providing multiple waypoints for a trip, and/or other suitable states. The URI can further specify one or more location parameters to control an execution of the mapping software application in the selected state.

For instance, the one or more location parameters can be specified at least in part by a query string associated with the URI. The location parameters and the query string format can be defined by the API. The one or more location parameters can include one or more state parameters associated with each state, and/or one or more state parameter values associated with each state parameter. For instance, the state for displaying a map can include a center point parameter associated with a location to be displayed in the center of the viewport of the map, a zoom level parameter associated with display of the map, and a map type parameter specifying a type of map to display. The state parameter values for the center point parameter can include coordinate values (e.g. latitude, longitude values) for the center point. The state parameter values for the zoom level parameter can include a numerical value indicative of a zoom level at which the map is to be displayed. The state parameter values for the map type parameter can a type of map view to be displayed (e.g. roadmap, satellite, terrain, transit, traffic, bicycling, etc.). The location parameters as defined by the API will be described in greater detail below.

According to example aspects of the present disclosure, the third-party software application can access the multi-platform API and can construct a URI in accordance with the common URI syntax of the API. In some implementations, the URI can be constructed responsive to a user interaction with the third-party application. For instance, the third-party application may include one or more user interface elements configured to facilitate a linking of the third-party software application and the mapping software application via an invocation of the API. Upon an interaction with one such user interface element and/or upon a user input specifying one or more location parameters, the third-party application can access the API and can generate a suitable URI using the common URI syntax of the API. The URI can provide instructions to launch the mapping application in a particular state, and for the mapping application to perform one or more actions within the launched state based at least in part on the specified location parameters. The URI can then be provided to the mapping software application.

In particular, the operating system platform running on the user device can open the URI. As indicated, because the URI is generated using a multi-platform syntax, the URI can be opened by various suitable operating systems. In some implementations, the operating system can then determine if the mapping application is present on the user device. For instance, if the Android operating system is running on the user device, the operating system can identify one or more intent filters associated with the mapping application specifying a capability of performing an activity associated with the URI. If the iOS operating system is running on the user device, the operating system can determine if a universal link has been registered for the domain associated with the URI, and then can determine if the mapping application has been installed on the user device.

If the mapping application is not detected by the user device, the URI can be opened, for instance, in a web browser installed on the user device. If the mapping application is detected by the user device, the URI can be opened in the mapping application. In this manner, opening the URI can cause the mapping application to launch in the application state specified in the URI. The mapping application can then determine the location parameters specified in the URI. For instance, the mapping application can parse the URI query string to extract the location parameters from the query string.

In some implementations, if the mapping application is unable to recognize one or more parameters associated with the query string and/or if mapping application is unable to support one or more parameters associated with the query string, the mapping application can provide the URI to one or more remote computing devices, such as a web server associated with the API. The server can then parse the URI, and can determine if the mapping application supports the requested parameters. If the mapping application supports such parameters, the server can generate a platform-specific URI and can provide the platform-specific URI back to the user device. If the mapping application does not support the parameters, the server can provide one or more signals to the user device instructing the user device to open the URI in a web browser.

Upon a determination that the actions specified by the URI can be performed by the mapping application (e.g. upon a determination that each query string parameter is supported and/or a reception of the platform-specific URI from the server), the mapping application can perform one or more actions based at least in part on the URI. For instance, the mapping application can interface with the server to receive suitable mapping information from the server, and to present the mapping information in a user interface of the mapping application. In particular, the mapping application can request the mapping information from the server based at least in part on the URI. The server can access a geographic information system hosted by the server and/or in another suitable location to determine the mapping information, and can provide the mapping information back to the user device for presentation by the mapping application.

In this manner, the mapping information can be determined based at least in part on the application state and/or the location parameters specified in the URI. For instance, if the URI specifies a navigation state, the mapping information can include route data including one or more routes between an origin location and a destination location as specified by the location parameters. The mapping information can further include instructions (e.g. audio instructions and/or visual instructions via a graphical user interface of the mapping application) for navigating the one or more routes in real time or near real time as the user traverses the route(s).

In this manner, according to particular aspects of the present disclosure, the API can include sets of computer-readable instructions that when executed by one or more processors facilitate a linking to the mapping software application from a developer's (e.g. third party) software application. In this manner, example instructions associated with an API that are facing a developer of a software application can include a set of instructions specifying one or more parameters and a common URI syntax that govern the linking of the developer's software application and the mapping application, as well as a display of a visual output of the mapping application. The sets of instructions can define a multi-platform URI syntax capable of being implemented by a plurality of operating system platforms. The sets of instructions, when implemented by one or more processors, can govern an interaction by the mapping software application with a geographic information system via the API as well as the display and/or delivery of mapping information to the user as part of the mapping software application. In particular, the sets of instructions can facilitate a "deep linking" into a particular state of the mapping software application from the third party software application, and a performance of one or more actions within the application state.

Providing a common URI syntax for an API according to example aspects of the present disclosure can allow for a single API to govern communication between third-party applications and the mapping application, regardless of the platform on which the mapping application is running. In addition, such API can alleviate the need for the third-party application to include logic for generating platform specific URIs. In particular, software applications interfacing with platform-specific APIs can require implementation of logic to determine an operating system of the user device on which the application is installed, and for generating native messages to the mapping application based on the platform specific API and the communication techniques implemented by the operating system. Such application logic can be inefficient and can be resource intensive. In addition, implementation of such logic can be inaccurate, and time consuming. In this manner, example APIs of the present disclosure can facilitate a conservation of resources, and a simple, streamlined communication process between applications.

With reference now to the figures, example aspects of the present disclosure will be discussed in greater detail. For instance, FIG. 1A depicts an overview of an example system 100 for linking one or more software applications according to example embodiments of the present disclosure. The system 100 can include a user device 102 that can receive mapping information from a mapping service provider 104 via a communication network 106. The user device 102 can be, for instance, a smartphone, tablet, wearable computing device, laptop, desktop, mobile device, device capable of being carried by a user while in operation, display with one or more processors, vehicle system, or other user device.

A first software application 108 and a second software application 110 can be implemented on the user device 102. In particular the first software application 108 and the second software application 110 can be implemented by an operating system platform 111 running on the user device 102. The first software application 108 can be, for instance, a mapping application, a ride share application, an application used to assist with delivery, a social media application or other software application that may need to provide mapping information to a user. In some implementations, the first software application 108 can be a web application configured to run in a web browser 109 installed on the user device 102. The second software application can be a mapping application for providing mapping information to a user. In some embodiments, the software applications 108, 110 can be developed by separate entities. For instance, the second software application 110 can be developed by an entity associated with the mapping service provider. The first software application 108 can be developed by a third party entity that is independent of and/or not affiliated with the entity associated the second software application 110 and the mapping service provider 104.

The first software application 108 can call a mapping API 112 to cause the second software application 110 to launch in a particular state of the application, and/or to control an interaction of the second software application 110 with a mapping engine 114 associated with the mapping service provider 104. In this manner, the API 112 can be used by the first software application 108 to cause the second software application 110 to access and provide mapping information from the mapping service provider 114 via the communication network 106. Example aspects of the present disclosure are discussed with accessing data from a remote mapping service provider 114 for purposes of illustration and discussion. Those of ordinary skill in the art, using the disclosures provided herein, will understand that the API 112 can access data from other sources, such as local sources or applications located on the user device 102. In addition, the API 112 can be associated with various other suitable applications and entities that provide services other than mapping services.

The second software application 110 can be configured to present mapping information to a user. In particular, the second software application 110 can be configured to operate in a plurality of application states to provide various suitable mapping data to the user. For instance, the second software application can operate in a map view state wherein an overhead (or other suitable) map is displayed to the user, a search state wherein the user can search for one or more locations or points of interest, a directions state wherein directions between an origin location and a destination location are provided to the user, a streetscape mode wherein one or more street level images of a streetscape are displayed to the user, a navigation state wherein navigation information (e.g., turn-by-turn navigation information) is provided to a user in real time or near real time as the user or vehicle carrying the user device 102 traverses along a route from an origin to one or more destinations, and/or other suitable states for providing mapping information to a user.

The second software application 110 can include a graphical user interface component for presenting the mapping information to the user on one or more display devices. Additionally or alternatively, the second software application can provide audio guidance or other notifications (e.g., vibratory notifications) to the user indicative of mapping information (e.g., turn-by-turn) directions.

According to example embodiments of the present disclosure, the navigation API 112 can facilitate an invocation of a particular application state of the second software application 110 by the first software application 108. The invocation can cause the second software application 110 to launch and/or execute on the user device 102 in the particular state. In particular, the first software application 108 can generate a URI to be passed to the second software application 110. The URI can include instructions for the second software application 110 to launch in an application state specified in the URI. In this manner, the URI can implement a deep link associated with the second software application 110 for launching the second software application in the specified application state.

The invocation of the second software application 110 can cause the second software application 110 to be brought to the foreground of a user interface of the user device 102, such that the user can view and/or interact with the second software application 110. For instance, if the second software application 110 is not currently running on the user device 102, the second software application 110 can be launched and brought to the foreground of the user interface responsive to the invocation. If the second software application 110 is currently running on the user device 102, the second software application 110 can be brought to the foreground of the user interface responsive to the invocation.

Figure 2:
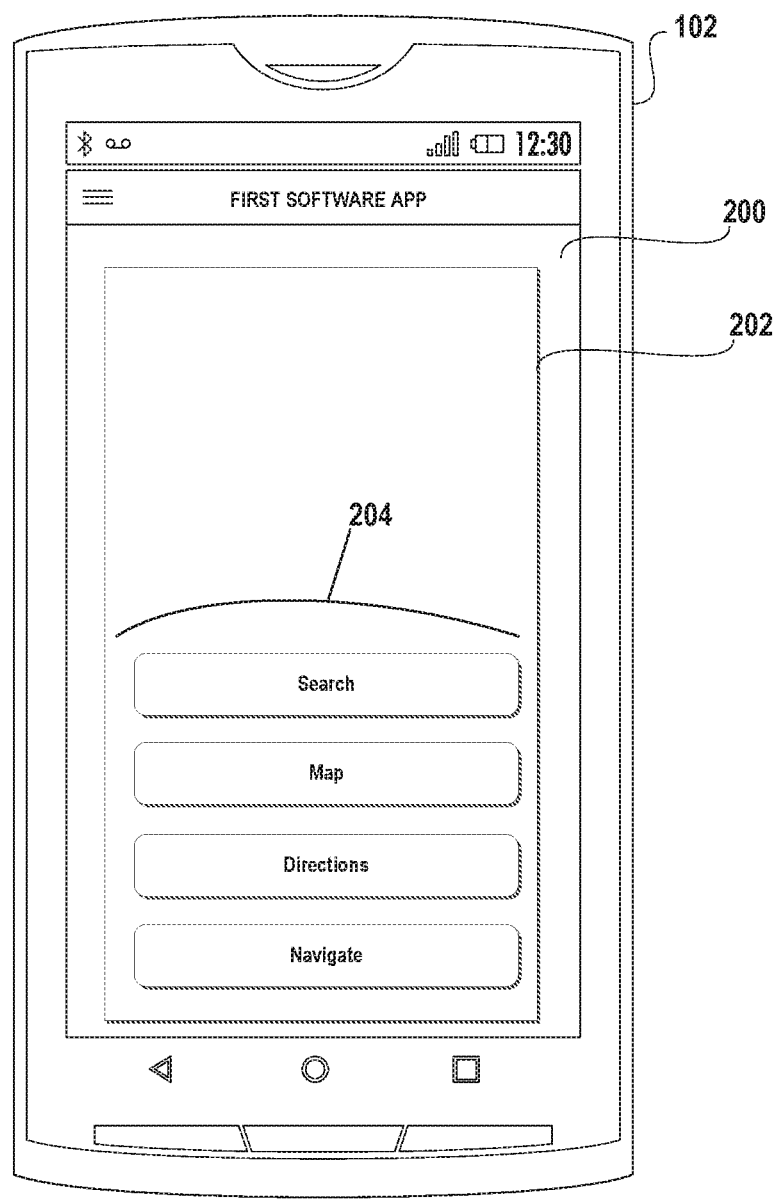
FIG. 2 depicts an example user interface of a third-party software application according to example embodiments of the present disclosure.

The invocation of the second software application 110 can occur responsive to a user interaction with a linking element displayed within a user interface of the first software application 108. For instance, FIG. 2 depicts an example graphical user interface component 200 of the first software application 108 according to example embodiments of the present disclosure. The graphical user interface component 200 can be displayed on a display device of the user device 102. The graphical user interface component can include a plurality of interface elements 202 that provide information associated with the first software application 108.

The graphical user interface component 200 can further include linking elements 204 configured to link or otherwise connect the first software application 108 and the second software application 110. As indicated the linking elements 204 can be selectable interface elements capable of receiving an input (e.g. touch input) by the user. The linking elements 204 can be associated with URIs for linking to the second software application 110 according to example embodiments of the present disclosure. In particular, each linking element 204 can be associated with a URI for deep linking to a particular state (e.g. map view state, directions state, navigation state) of the second software application. In this manner, upon a user interaction with linking element 204, the first software application 108 can generate a URI associated with the selected linking element 204. The URI can include instructions for launching the second software application 110 in the appropriate application state. The URI can further include a query string specifying one or more suitable location parameters to be used by the second software application 110 in determining mapping information to present to the user. In some implementations, the location parameters can be specified by the user, for instance, through an interaction with the first mapping application 108. For instance, the user can specify an origin location and/or a destination location to facilitate a determination of a travel route between the origin location and the destination location to be presented in the second software application.

Figure 3:
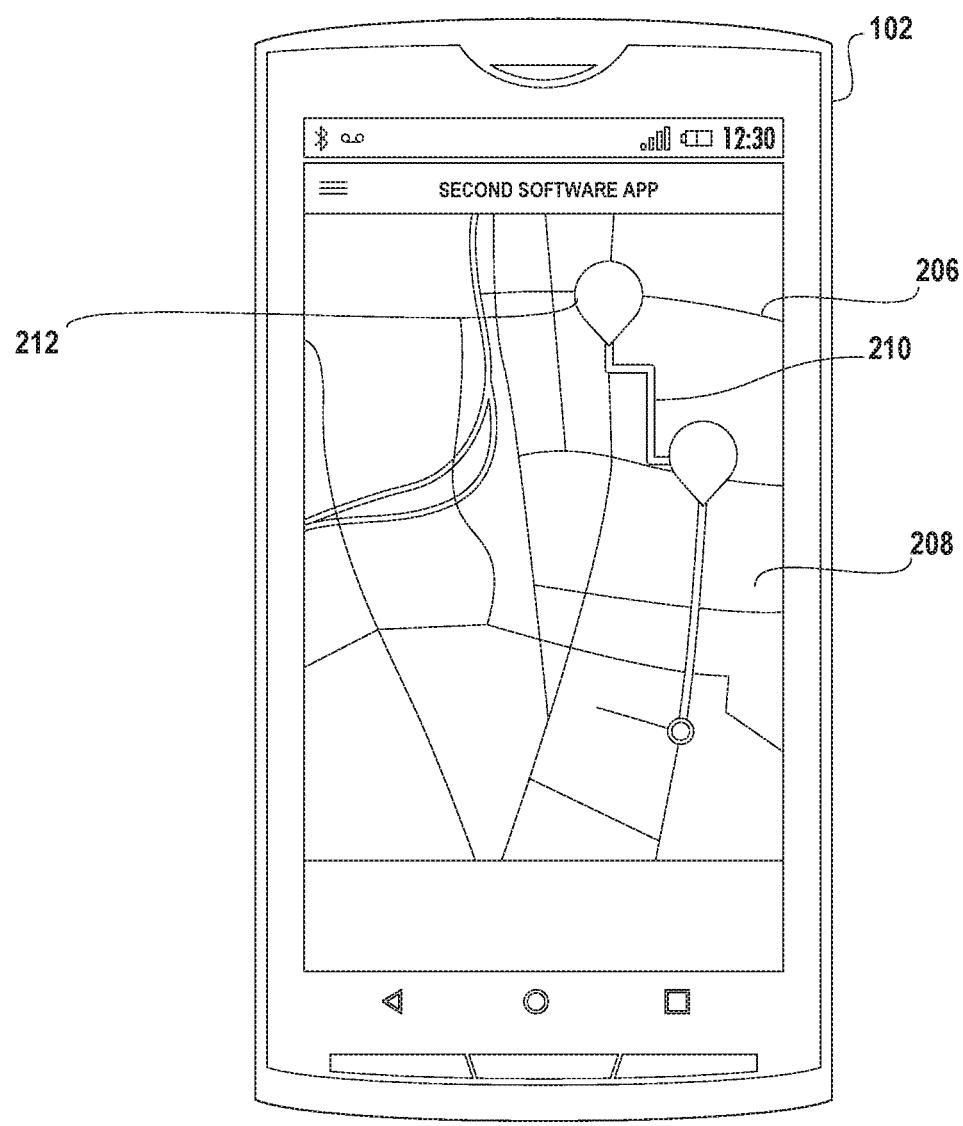
FIG. 3 depicts an example user interface of a mapping software application according to example embodiments of the present disclosure.

The second software application 110 can be launched on the user device 102 and/or brought to the foreground of the user interface of the user device 102 in response to a user interaction with a linking element 204. In particular, the second software application 110 can be launched in the selected state as specified by the URI. FIG. 3 depicts an example graphical user interface component 206 of the second software application 110 according to example embodiments of the present disclosure. The graphical user interface component 206 can be displayed on a display device of the user device 102. The graphical user interface component 206 can include various interface elements that provide navigation information to a user as part of a navigation service. The graphical user interface component 206 depicts a user interface associated with a navigation state of the second software application 110. For instance, as shown in FIG. 3, the graphical user interface component 206 includes a map 208 as well as a route 210 to a destination location 212 presented on the map 208. The route 210 is displayed on a top down view of the map 208 to provide a route overview.

It will be appreciated that the graphical user interface component 206 is intended for illustrative purposes only. In particular, it will be appreciated that the second software application 110 can have various other suitable interfaces that present suitable mapping information in a number of manners. For instance, the second software application 110 can include various other suitable graphical user interface configurations associated with the various other suitable states of the second software application 110. For instance, the second software application may include a user interfaces for a navigation state, directions state, map view state, search state, and/or other suitable application states of the second software application 110. As another example, the second software application 110 may include an interface for presenting mapping information in text form, such as written instructions for traversing route 210. As yet another example, the second software application 110 may include an interface for receiving a search query and presenting search results determined based at least in part on the search query.

Referring back to FIG. 1A, the API 112 can define a common URI syntax for linking the first software application 108 and the second software application 110. The common URI syntax can be configured for use by a variety of operating system platforms. In this manner, a URI generated by the first software application 108 can be consistent across operating system platforms. For example, an instance of the first software application 108 running on an Android operating system can generate a URI having the same syntax and format as a URI generated by an instance of the first software application 108 running on an iOS operating system or other suitable operating system.

In some implementations, the URI generated by the first software application 108 can be provided to the platform 111. The platform 111 can then determine whether the second software application 110 is present on the user device. For instance, if the platform 111 is an Android operating system, the platform 111 can attempt to detect the presence of the second software application 110 based on one or more intent filters associated with the second software application 110. If the platform 111 is an iOS operating system, the platform 111 can attempt to detect the presence of the second software application 110 based at least in part on one or more universal links associated with the second software application 110.

Upon detecting the presence of the second software application 110, the second software application 110 can be launched in the application state specified by the URI. The second software application 110 can then identify the location parameters contained within the URI. For instance, the second software application 110 can parse the query string to extract the location parameters. In some implementations, upon parsing the query string, the second software application 110 can be configured to determine if the query string includes any unrecognized or unsupported location parameters. If the query string contains at least one unrecognized or unsupported location parameter, the second software application can provide the query string to the mapping service provider 104. The mapping service provider 104 can parse the query string to determine if the second software application 110 supports the at least one location parameter using platform-specific URI syntax (e.g. a URI configured for use by the platform 111). For instance, the mapping service provider 104 can determine if the second software application 110 perform one or more suitable actions associated with the at least one location parameter upon receiving a platform-specific URI. If the second software application 110 is unable to support the location parameter, the mapping service provider can provide one or more signals to the user device 102 instructing the user device 102 to open the URI in a web browser installed on the user device 102. If the second software application is able to support the at least one location parameter, the mapping service provider 104 can provide the platform-specific URI to the second software application 110.

The second software application 110 can request mapping information from the mapping service provider 104. For instance, the second software application 110 can request the mapping information upon a determination that each location parameter in the URI associated with the API 112 is supported, or upon receipt of the platform-specific URI from the mapping service provider 104. In this manner, the location parameters passed to the second software application 110 as part of the common platform URI associated with the API 112 or the platform-specific URI can be provided to the mapping service provider 104, and used by the mapping service provider 104 to determine the mapping information (e.g. route 210, map data 208, etc.) through an interaction with the mapping engine 114. The mapping engine 114 can be configured to, for instance, obtain search results associated with a search query, compute routes and/or directions to one or more locations, access mapping data, access imagery data, update navigation data based on various navigation events, and/or other suitable tasks.

In some embodiments, the mapping service provider 104 can include one or more servers 115, such as web servers. The one or more servers 115 can include one or more processors 116 and one or more memory devices 117. The one or more memory devices 117 can store computer-readable instructions to implement, for instance, the mapping engine 114. In some embodiments, the mapping engine 114 can access data associated, for instance, with a geographic information system 118. The geographic information system 118 can include data that is indexed by geographic coordinates of its elements. The data associated with the geographic information system 118 can include, for instance, map data, route data, geographic imagery, data associated with various waypoints (e.g., business listing names, addresses, geographic coordinates, etc.), and/or other data.

Data indicative of the mapping information as determined by mapping engine 114 can be provided to the second software application 110 by the mapping service provider 104. In some implementations, the second software application 110 can present the mapping information within the user interface of the second software application 110.

The second software application 110 can interact with the mapping service provider 114 via the network 116. The network 116 can be any type of communications network, such as a local area network (e.g. intranet), wide area network (e.g. Internet), cellular network, or some combination thereof. The network 116 can also include a direct connection. In general, communication can be carried via network 116 using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Figure 4:
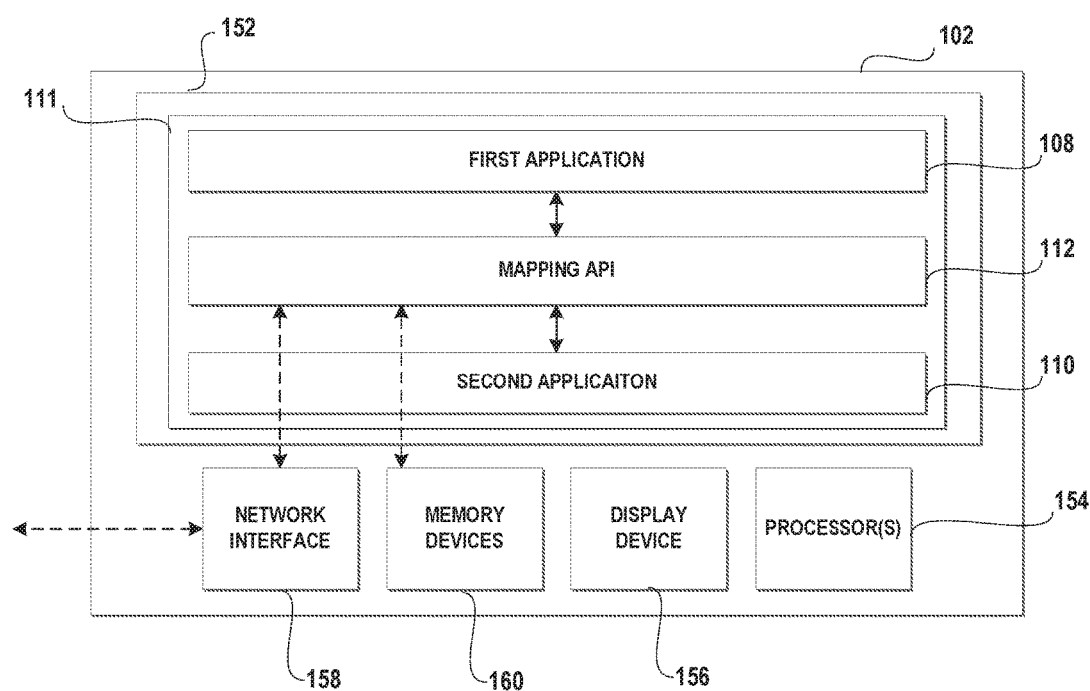
FIG. 4 depicts a block diagram of an example user device according to example embodiments of the present disclosure.

FIG. 4 depicts an example user device 102 configured to implement a mapping API 112 according to example embodiments of the present disclosure. As shown, the user device 102 includes an instruction memory 152, one or more processors 154 configured to execute instructions stored in the memory 152, a display device 156, a network interface 158 that supports network communications, and a storage memory 160. The one or more processors 154 can include any suitable processing device, such as a microprocessor, microcontroller, integrated circuit, logic device, or other suitable processing device. For clarity, the instruction memory 152 and the storage memory 160 are illustrated separately. It will be understood, however, that the components 152 and 160 can also be regions within the same memory module. More generally, the user device 102 can include one or more additional processors, memory devices, network interfaces, which may be provided separately or on a same chip or board. The components 152 and 160 can include one or more computer-readable media, including, but not limited to, non-transitory computer-readable media, RAM, ROM, hard drives, flash drives, or other memory devices.

The instruction memory 152 can store sets of instructions of an operating system (OS) 111, a mapping API 112, and a first software application 108 and a second software application 110. The OS 111 can be a mobile OS developed specifically for mobile devices. As such, the OS 111 can include functions that allow the software application to access data such as wireless network parameters (e.g., identity of the wireless network, quality of service), as well as invoke services such as telephony, location determination (e.g., via global positioning service (GPS) or WLAN), wireless network data call origination, etc. In other implementations, the OS 111 is a general-purpose operating system that operates on both mobile and stationary devices, such as smartphones and desktop computers, for example. In some example implementations, the OS 111 includes or based upon an Android mobile operating system developed by Google Inc., or an iOS mobile operating system developed by Apple, Inc. However, other suitable operating systems can be used without deviating from the scope of the present disclosure.

The first software application 108 can be, for example, a mapping application, a navigation application, ride share application, an application to assist with delivery, a social media application, etc. The second software application 110 can provide a mapping experience from a mapping service. The software applications 108, 110 can be native applications or web-based applications. The first software application 108 can perform a call to API 112 to invoke the second software application 110. In general, the navigation API 112 can be made available to any suitable software application that executes on the user device 102. Also, multiple different software applications may invoke the navigation API 112.

In some implementations, the user device 102 can include a positioning system. The positioning system can include one or more devices or circuitry for determining the position of a device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, beacons, and the like and/or other suitable techniques for determining position. The positioning system can determine a user location associated with the user device 102. The user location can be provided to the mapping service provider 104 for use by the mapping service provider 104 in determining mapping information associated with the user device 102.

The API 112 can be implemented as one or several functions, a data structure, etc. Further, the API 112 may include compiled code that executes directly on the processor(s) 154 or, alternatively, instructions in any other form such as a scripting language interpreted at runtime by the applications 108, 110. The API 112 in one example implementation includes well-documented prototypes of several functions which a developer can include in the code of the software applications 108, 110, as well as instructions that implement these functions. In some embodiments, the API 112 can be provided to the developer as a static library.

As indicated, the API 112 can specify a common URI syntax as well as location parameters that can be implemented by various suitable operating system platforms. In some implementations, the API 112 can include a set of base capabilities that are supported on each platform supported by the API 112. For instance, such base capabilities can include URIs and location parameters for various suitable application states associated with the Google Maps application for an Android operating system and an iOS operating system. In particular, the base capabilities can have an associated base URI and location parameters (e.g. state parameters and state parameter values). Each base capability can correspond to an application state of the second software application 112. For instance, the base capabilities can be associated with a map view state of the second software application 110, as depicted in FIG. 1C.

The base capabilities can further be associated with a search state of the second software application 110, as depicted in FIG. 1D.

The base capabilities can further be associated with a directions state of the second software application 110, as depicted in FIG. 1E.

As one particular example, the first software application 108 can generate a URI requesting that the second software application 110 launch in a directions state of the second software application 110. The URI can be generated using the common URI syntax specified above. For instance, the URI can specify location parameters indicative of an origin location, a destination location, and one or more routes or travel modes to avoid. For instance, FIG. 1B depicts a URI according to example aspects of the present disclosure. URI 120 can be requesting directions from Oslo, Norway to Telemark, Norway.

In URI 120, the portion of the URI preceding the "?" can specify the selected state (e.g. directions state) of the second software application 110. The "?" can be a terminator that identifies the beginning of the query (and/or the end of the URI). The "&origin" portion can specify a starting point for directions with location parameters (e.g., "Oslo, Norway"). The "&destination" portion can specify a location for which directions should be determined from the starting location (e.g. Telemark, Norway). The "&avoid" portion can specify one or more travel routes or travel modes to avoid (e.g. routes including tolls and highways). It will be appreciated that various other suitable URIs can be generated.

The base capabilities can further be associated with a streetscape (e.g. Streetview) state of the second software application 110, as depicted in FIG. 1F.

The API 112 may further have additional capabilities. For instance, the additional capabilities may include platform-specific capabilities capable of being implemented only one or more particular operating system platforms. The additional capabilities may further include experimental capabilities, and/or version-specific capabilities capable of being implemented by certain versions of the second software application 110. The additional capabilities can be associated with one or more application states associated with second software application 110. For instance, the platform-specific capabilities can be associated with application states capable of being implemented by the second software application running on particular operating system platforms. The version-specific capabilities can be associated with application states capable of being implemented by the certain versions of the second software application.

The additional capabilities can be associated with a navigation state of the second software application 110, as depicted in FIG. 1G.

The additional capabilities can further be associated with a multiple waypoints application state of the second software application 110, as depicted in FIG. 1H.

Figure 5:
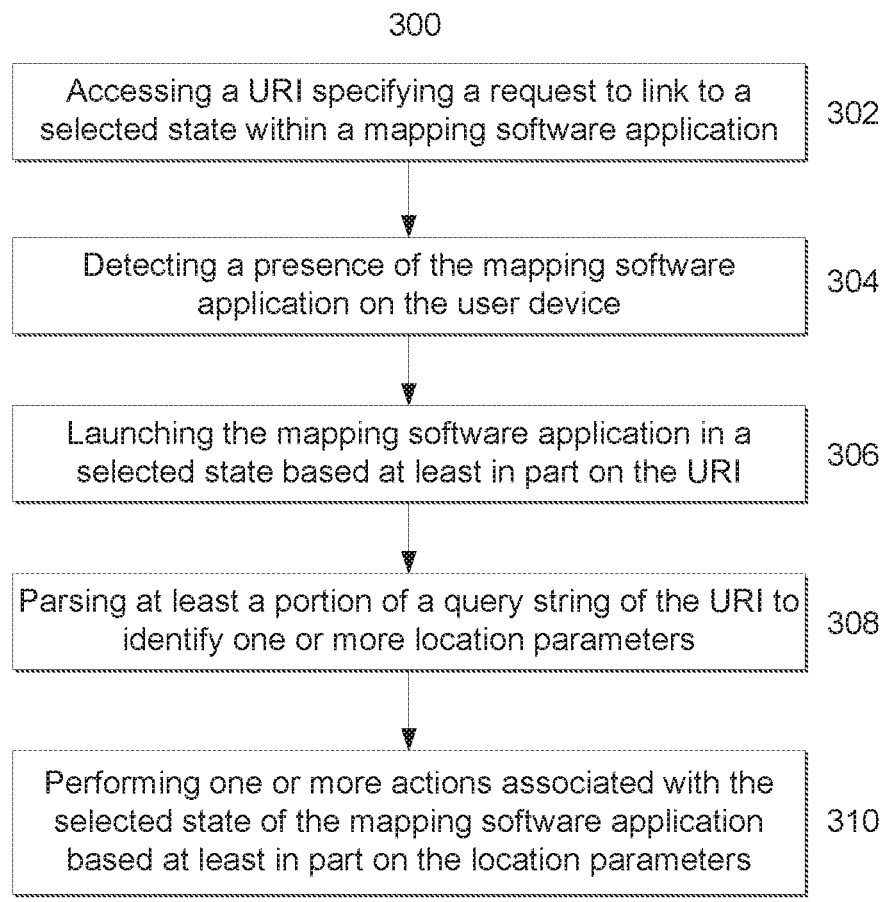
FIG. 5 depicts a flow diagram of an example method for linking two or more software applications according to example embodiments of the present disclosure.

FIG. 5 depicts a flow diagram of an example method (300) of linking one or more software applications according to example embodiments of the present disclosure. Method (300) can be implemented by one or more computing devices, such as one or more of the computing devices depicted in FIG. 1A. In particular implementations, the method (300) can be implemented by the user device 102 depicted in FIG. 1A. In addition, FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include accessing a URI specifying a request to link to a selected application state within a mapping software application. For instance, the URI can be generated by a third-party software application that is not associated with an entity that develops the mapping software application. The URI can be generated by accessing data indicative of a multi-platform API for linking to the mapping software application. The API can include a common URI syntax configured for use by two or more operating system platforms. The URI syntax can include a plurality of URIs for deep linking into a particular state of the mapping application. In this manner, each URI can correspond to a particular state. The URI syntax can further include location parameters for each URI. The location parameters can include state parameters and state parameter values for determination of mapping information by a mapping engine associated with a mapping service provider. In this manner, the URI generated by the third-party software application can include a query string specifying the location parameters associated with the application state.

In some implementations, the URI can be accessed by an operating system running on a user device. For instance, the third-party software application can provide the URI to the operating system, such that the operating system can in turn pass the URI to the mapping software application. As indicated, because the URI is a cross-platform URI that is configured for use by a plurality of operating systems, the URI can be constructed and passed to the operating system without an app-level determination of the operating system running on the user device.

At (304), method (300) can include detecting a presence of the mapping software application on the user device. For instance, in response to receiving the URI from the third-party software application, the operating system can determine whether the mapping software application is present on the user device. As indicated above, an Android operating system running on the user device can detect the presence of the mapping application based at least in part on one or more intent filters associated with the mapping application, while an iOS operating system running on the user device can detect the presence of the mapping application based at least in part on one or more universal links associated with the mapping application.

At (306), method (300) can include launching the mapping software application in the selected state based at least in part on the URI. The mapping software application can be launched in the selected state responsive to detecting the presence of the mapping software application on the user device. More particularly, in some implementations, upon a detection of the mapping software application on the user device, the operating system can launch the mapping software application, and can provide the URI to the mapping software application causing the mapping application to launch in the selected state specified in the URI. In some implementations, if the mapping software application is not present on the user device, the URI can be launched in a web browser associated with the user device.

At (308), method (300) can include parsing at least a portion of the query string included in the URI to identify the one or more or more location parameters specified in the query string. For instance, the mapping software application, upon launching in the selected application state, can parse the query string to determine the location parameters to be provided to a mapping service provider. In this manner, the URI can specify such location parameters for governing an interaction of the mapping software application with the mapping service provider.

At (310), method (300) can include performing one or more actions associated with the selected state of the mapping software application based at least in part on the location parameters. As will be described in greater detail below with reference to FIG. 7, the one or more actions can include requesting mapping information from the mapping service provider based at least in part on the URI, receiving data indicative of the mapping information from the mapping service provider, and presenting the mapping information in a user interface associated with the mapping software application.

Figure 6:
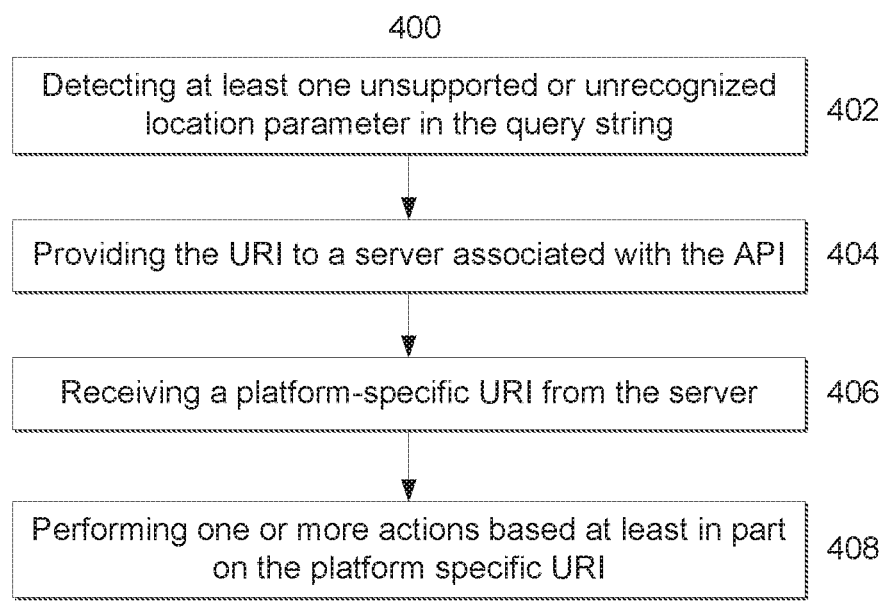
FIG. 6 depicts a flow diagram of an example method of determining location parameters according to example embodiments of the present disclosure.

In some implementations, one or more location parameters associated with the query string may not be supported or recognized by the mapping software application. In such implementations, a determination of the location parameters may include communication with one or more remote computing devices. For instance, FIG. 6 depicts a flow diagram of an example method (400) of determining location parameters according to example embodiments of the present disclosure. Method (400) can be implemented by one or more computing devices, such as one or more of the computing devices depicted in FIG. 1A. In particular implementations, the method (400) can be implemented by the user device 102 depicted in FIG. 1A.

At (402), method (400) can include detecting at least one unsupported or unrecognized location parameter in the query string. For instance, an unsupported or unrecognized location parameter can be a location parameter associated with a feature that is not supported by the mapping application. For instance, the feature may be a platform-specific feature that is not supported by the mapping application as implemented on the operating system platform running on the user device. As another example, the feature may be a feature not supported on the particular version of the mapping application running on the user device. The unsupported or unrecognized location parameter(s) can be detected at least in part from the parsed query string.

At (404), method (400) can include providing the URI to a server associated with the API. For instance, the server can be the mapping service provider depicted in FIG. 1A. At (406), method (400) can include receiving a platform-specific URI from the server. In particular, upon receiving the URI from the user device, the server (e.g. the mapping service provider) can determine whether the mapping software application running on the user device supports the requested feature associated with the unsupported or unrecognized location parameter. If it is determined that the mapping software application supports the requested feature, the server can generate a platform-specific URI and can provide the platform-specific URI to the user device. The platform-specific URI can be a URI configured specifically for use by the particular operating system platform running on the user device. In this manner, the platform-specific URI can include a URI construction or syntax that is recognizable by the operating system running on the user device. At (408), method (400) can include performing one or more actions based at least in part on the platform-specific URI. For instance, upon receiving the platform-specific URI, the mapping software application can determine one or more location parameters specified by the platform-specific URI, and can request mapping information from the server based at least in part on the location parameters.

Figure 7:
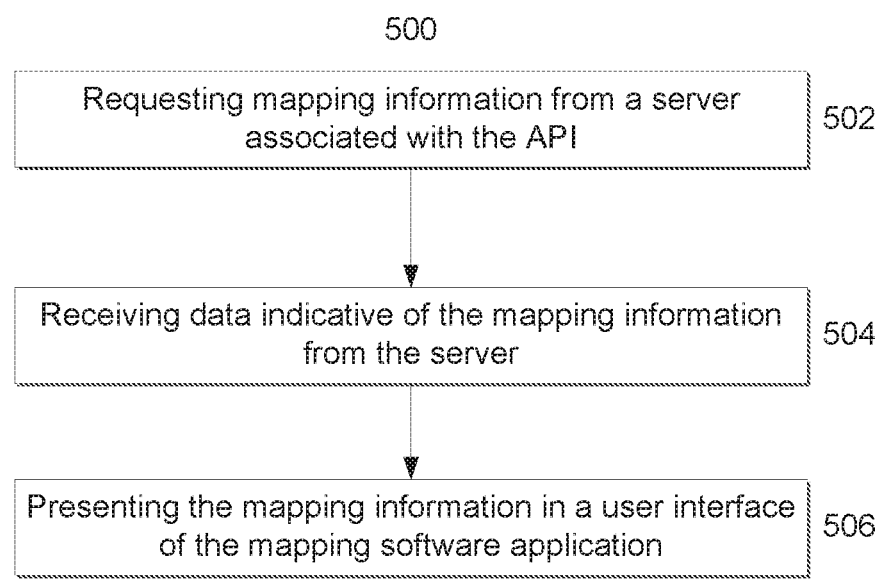
FIG. 7 depicts a flow diagram of an example method of presenting mapping information to a user according to example embodiments of the present disclosure.

As indicated above, the multi-platform API can be implemented by a third-party software application to link to a particular state within a mapping software application and to govern an interaction of the mapping software application with a mapping service provider associated with the mapping software application. FIG. 7 depicts a flow diagram of an example method (500) for performing one or more actions associated with a selected state of a mapping software application. Method (500) can be implemented by one or more computing devices, such as one or more of the computing devices depicted in FIG. 1A. In particular implementations, the method (500) can be implemented by the user device 102 depicted in FIG. 1A.

At (502), method (500) can include requesting suitable mapping information from a server (e.g. mapping service provider) associated with the multi-platform API and/or the mapping software application. The mapping information can be requested, for instance, by providing data indicative of a request for suitable mapping information to the server. For instance, such data indicative of the request can include the location parameters extracted from the URI to the mapping software application. The server can determine the request mapping information based at least in part on the location parameters. For instance, the server can access and/or communicate with a mapping engine associated with to geographic information system to determine such mapping information.

The mapping service provider can provide data indicative of the mapping information to the user device. In this manner, at (504), method (500) can include receiving the data indicative of the mapping information from the mapping service provider. At (506), method (500) can include presenting the mapping information in a user interface of the mapping software application. The user interface can be an interface associated with the launched application state of the mapping application. The user interface can be, for instance, a graphical user interface configured to display the mapping information to the user, and auditory user interface configured to provide audio information (e.g. audio guidance, turn-by-turn instructions, etc.) to the user, and/or other suitable user interface.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of linking two or more applications associated with one or more user devices, the method comprising:
    accessing, by one or more processors, a uniform resource identifier (URI) specifying a request to link to a selected state within a mapping software application from a third-party software application associated with a user device, the URI being associated with a multi-platform application programming interface (API) associated with the mapping software application and configured for use by a plurality of different operating system platforms, the multi-platform API comprising a common URI syntax for use within the plurality of different operating system platforms without an application-level determination of an operating system platform on which the third-party software application and the mapping software application are executing, the URI comprising a query string specifying one or more location parameters in accordance with the common URI syntax, the one or more location parameters configured to control an execution of the selected state by the mapping software application on the user device;
    detecting, by the one or more processors, a presence of the mapping software application on the user device;
    responsive to detecting the mapping software application, launching, by the one or more processors, the mapping software application in the selected state based at least in part on the URI;
    parsing, by the one or more processors, at least a portion of the query string to identify the one or more location parameters; and
    performing, by the one or more processors, one or more actions associated with the selected state of the mapping software application based at least in part on the one or more location parameters.

2. The computer-implemented method of claim 1, wherein the one or more location parameters comprise one or more state parameters associated with the selected state.

3. The computer-implemented method of claim 2, wherein the one or more state parameters comprise parameters for performing the one or more actions associated with the selected state.

4. The computer-implemented method of claim 1, further comprising:
    detecting, by the one or more processors, at least one location parameter that is not supported by the mapping software application based at least in part on the parsing;
    providing, by the one or more processors, the URI to a remote computing device; and
    receiving, by the one or more processors, a platform specific URI from the remote computing device;
    wherein the remote computing device is configured to parse the URI and to generate the platform specific URI based at least in part on the parsing.

5. The computer-implemented method of claim 1, wherein the URI is generated by the third-party software application based at least in part on the multi-platform API.

6. The computer-implemented method of claim 5, wherein the URI is generated in response to a user interaction with one or more user interface elements of the third-party software application.

7. The computer-implemented method of claim 1, wherein the third-party software application is stored on the user device.

8. The computer-implemented method of claim 1, wherein the third-party software application is a web-based software application.

9. The computer-implemented method of claim 1, wherein performing, by the one or more processors, one or more actions associated with the selected state of the mapping software application comprises:
    requesting, by the one or more processors, mapping information from a remote computing device associated with the mapping software application;
    receiving, by the one or more processors, data indicative of the mapping information from the remote computing device; and
    presenting, by the one or more processors, the mapping information in a user interface associated with the mapping software application.

10. The computer-implemented method of claim 9, wherein presenting, by the one or more processors, the mapping information in a user interface comprises providing the mapping information for display in a graphical user interface of the mapping software application.

11. A computing system, comprising:
    one or more processors; and
    one or more memory devices, the one or more memory devices storing computer-readable instructions that when executed by the one or more processors cause the one or more processors to perform operations, the operations comprising:
        accessing a uniform resource identifier (URI) specifying a request to link to a selected state within a mapping software application from a third-party software application associated with a computing device, the URI being associated with a multi-platform application programming interface (API) associated with the mapping software application and configured for use by a plurality of different operating system platforms, the multi-platform API comprising a common URI syntax for use within the plurality of different operating system platforms without an application-level determination of an operating system platform on which the third-party software application and the mapping software application are executing, the URI comprising a query string specifying one or more location parameters in accordance with the common URI syntax, the one or more location parameters configured to control an execution of the selected state by the mapping software application on the computing device;

detecting a presence of the mapping software application on the computing device;

responsive to detecting the mapping software application, launching the mapping software application in the selected state based at least in part on the URI;

parsing at least a portion of the query string to identify the one or more location parameters; and performing one or more actions associated with the selected state of the mapping software application based at least in part on the one or more location parameters.

12. The computing system of claim 11, wherein the one or more location parameters comprise one or more state parameters associated with the selected state.

13. The computing system of claim 12, wherein the one or more state parameters comprise parameters for performing the one or more actions associated with the selected state.

14. The computing system of claim 11, the operations further comprising:

detecting at least one location parameter that is not supported by the mapping software application based at least in part on the parsing;

providing the URI to a remote computing device; and receiving a platform specific URI from the remote computing device;

wherein the remote computing device is configured to parse the URI and to generate the platform specific URI based at least in part on the parsing.

15. The computing system of claim 11, wherein the URI is generated by the third-party software application based at least in part on the multi-platform API.

16. The computing system of claim 15, wherein the URI is generated in response to a user interaction with one or more user interface elements of the third-party software application.

17. The computing system of claim 11, wherein performing one or more actions associated with the selected state of the mapping software application comprises:

requesting mapping information from a remote computing device associated with the mapping software application;

receiving data indicative of the mapping information from the remote computing device; and presenting the mapping information in a user interface associated with the mapping software application.

18. The computing system of claim 11, wherein the third-party software application is stored on the computing device.

19. A non-transitory computer-readable medium storing instructions that implement a multi-platform application programming interface (API) for linking two or more software applications associated with a computing device, the computing device having one or more processors and a display device, the API comprising:

a set of instructions for linking to an application state of a mapping software application from a third-party software application, the application state associated with a mapping service to be provided by the mapping software application;

wherein the set of instructions comprises a common uniform resource identifier (URI) syntax configured for use by a plurality of different operating system platforms without an application-level determination of an operating system platform on which the third-party software application and the mapping software application are executing, the common URI syntax comprising instructions for linking to a plurality of application states of the mapping software application as implemented by any of the plurality of different operating system platforms.

20. The non-transitory computer-readable medium of claim 19, wherein the common URI syntax further comprises one or more location parameters associated with each application state for performing one or more actions associated with the selected state.

* * * * *